US010556824B2

(12) United States Patent
Disteldorf et al.

(10) Patent No.: US 10,556,824 B2
(45) Date of Patent: *Feb. 11, 2020

(54) COATED ARTICLE WITH IR REFLECTING LAYER(S) AND SILICON ZIRCONIUM OXYNITRIDE LAYER(S) AND METHOD OF MAKING SAME

(71) Applicants: GUARDIAN EUROPE S.A.R.L., Bertrange (LU); GUARDIAN GLASS, LLC, Auburn Hills, MI (US)

(72) Inventors: Bernd Disteldorf, Mettlach (DE); Anton Dietrich, Fontnas (CH); Francis Wuillaume, Plymouth, MI (US)

(73) Assignees: GUARDIAN EUROPE S.A.R.L., Bertrange (LU); GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,468

(22) Filed: Jun. 28, 2019

(65) Prior Publication Data
US 2020/0017403 A1 Jan. 16, 2020

Related U.S. Application Data

(63) Continuation of application No. 16/036,013, filed on Jul. 16, 2018, now Pat. No. 10,336,651.

(51) Int. Cl.
*B32B 15/04* (2006.01)
*B32B 17/06* (2006.01)
*C03C 17/36* (2006.01)

(52) U.S. Cl.
CPC ........ *C03C 17/366* (2013.01); *C03C 17/3626* (2013.01); *C03C 17/3644* (2013.01);
(Continued)

(58) Field of Classification Search
USPC ................ 428/428, 432, 434, 688, 701, 702
See application file for complete search history.

(56) References Cited

U.S. PATENT DOCUMENTS 5,110,637 A 5/1992 Ando
5,821,001 A * 10/1998 Arbab .................... C03C 17/36
428/623

(Continued)

OTHER PUBLICATIONS

U.S. Appl. No. 16/036,013, filed Jul. 16, 2018; Disteldorf et al.

*Primary Examiner* — Lauren R Colgan

(57) ABSTRACT

A low-emissivity (low-E) coating includes first and second infrared (IR) reflecting layers of or including a material such as silver. The coating includes a bottom dielectric portion including a layer of or including silicon zirconium oxynitride, and a center dielectric portion including a layer of or including zinc stannate. The coating is configured to realize a combination of desirable visible transmission, consistent and low emissivity values, thermal stability upon optional heat treatment such as thermal tempering, desirable U-value, desirable LSG value, and desirable coloration and/or reflectivity values to be achieved. In certain example embodiments, an absorber layer sandwiched between a pair of dielectric layers may be provided in. Coated articles herein may be used in the context of insulating glass (IG) window units, or in other suitable applications such as monolithic window applications, laminated windows, and/or the like.

10 Claims, 8 Drawing Sheets

(52) U.S. Cl.
CPC .... *C03C 17/3681* (2013.01); *C03C 2217/211* (2013.01); *C03C 2217/212* (2013.01); *C03C 2217/228* (2013.01); *C03C 2217/24* (2013.01); *C03C 2217/256* (2013.01); *C03C 2217/281* (2013.01); *C03C 2218/156* (2013.01)

(56) References Cited

U.S. PATENT DOCUMENTS

| | | | |
|---|---|---|---|
| 6,291,867 | B1 | 9/2001 | Wallace |
| 6,589,658 | B1 | 7/2003 | Stachowiak |
| 6,830,817 | B2 | 12/2004 | Stachowiak |
| 6,833,194 | B1 * | 12/2004 | O'Shaughnessy ............ C03C 17/2453 428/432 |
| 6,899,953 | B1 * | 5/2005 | O'Shaughnessy ............ C03C 17/2453 428/336 |
| 7,153,578 | B2 | 12/2006 | Chonlamaitri |
| 7,390,572 | B2 | 6/2008 | Butz |
| 7,846,492 | B2 | 12/2010 | Veerasamy |
| 7,892,662 | B2 | 2/2011 | Veerasamy |
| 8,105,695 | B2 | 1/2012 | Depauw |
| 8,440,310 | B2 * | 5/2013 | Ferreira ............ B32B 17/10036 428/432 |
| 8,557,391 | B2 | 10/2013 | Frank |
| 8,940,400 | B1 | 1/2015 | Wuillaume |
| 9,150,003 | B2 | 10/2015 | Dietrich |
| 9,302,936 | B2 * | 4/2016 | Wuillaume ............. C03C 17/36 |
| 9,309,149 | B2 | 4/2016 | Ding |
| 9,410,359 | B2 * | 8/2016 | Ding .................... E06B 3/6715 |
| 9,738,561 | B2 | 8/2017 | Butz |
| 9,816,316 | B2 | 11/2017 | Lao |
| 10,138,158 | B2 * | 11/2018 | Ding .................. C03C 17/3435 |
| 10,138,159 | B2 * | 11/2018 | Ding .................. C03C 17/3615 |
| 2006/0121290 | A1 * | 6/2006 | Chonlamaitri ......... C03C 17/36 428/428 |
| 2007/0281171 | A1 | 12/2007 | Coster |
| 2008/0187692 | A1 * | 8/2008 | Roquiny ................. C03C 17/36 428/34 |
| 2009/0068447 | A1 * | 3/2009 | Blacker .................. C03C 17/36 428/336 |
| 2009/0130409 | A1 * | 5/2009 | Reutler ............ B32B 17/10018 428/216 |
| 2010/0279144 | A1 | 11/2010 | Frank |
| 2014/0071524 | A1 * | 3/2014 | Disteldorf .......... C03C 17/3441 359/360 |
| 2016/0031750 | A1 | 2/2016 | Ridealgh |
| 2018/0066142 | A1 * | 3/2018 | Disteldorf .......... C03C 17/3644 |

\* cited by examiner

| SN 70/35 HT | d (nm) |
|---|---|
| SiN | 21.0 |
| SnO2 | 15.2 |
| NiCrOx | 2.5 |
| Ag | 14.4 |
| ZnO | 18.0 |
| ZnSnOx | 15.3 |
| SiN | 14.0 |
| C22 | 1.3 |
| SiN | 14.0 |
| ZnSnOx | 24.2 |
| NiCrOx | 2.5 |
| Ag | 9.1 |
| ZnO | 8.0 |
| ZnSnOx | 6.0 |
| TiOx | 3.0 |
| ZrSiOxNy | 9.6 |
| GLASS | |

Fig. 3
(Examples 2, 4 and 6)

| SN 70/35 A | d (nm) |
|---|---|
| SiN | 21.0 |
| SnO2 | 15.2 |
| NiCrOx | 2.5 |
| Ag | 13.9 |
| ZnOx | 38.0 |
| ZnSnOx | 25.0 |
| NiCrOx | 2.5 |
| Ag | 10.5 |
| ZnOx | 7.0 |
| ZnSnOx | 5.0 |
| TiOx | 3.0 |
| ZrSiOxNy | 14.8 |
| GLASS | |

Fig. 4
(Examples 1, 3 and 5)

| Target | Reactive gas | thickness |
|---|---|---|
| SiAl | N2 | 16 |
| Sn | O2 | 18 |
| NiCr | O2 | 3 |
| Ag | none | 16 |
| Zn | O2 | 14 |
| ZnSn | O2 | 70 |
| NiCr | O2 | 3 |
| Ag | none | 10 |
| Zn | O2 | 8 |
| ZnSn | O2 | 8 |
| TiOx | O2 | 5 |
| SiZr | O2-N2 | 8 |
| | Glass | |

SN 63-33 HT

| Material | d (nm) |
|---|---|
| SiN | 19.0 |
| SnO2 | 7.5 |
| NiCrOx | 2.5 |
| Ag | 13.1 |
| ZnO | 20.0 |
| ZnSnOx | 18.8 |
| SiN | 12.0 |
| SiN | 5.5 |
| ZnSnOx | 12 |
| NiCrOx | 10.0 |
| Ag | 7.5 |
| ZnO | 8.5 |
| ZnSnOx | 6.6 |
| TiO | 7.0 |
| ZnSnOxNy | 10 |
| | 19.9 |

SN 63-33 A

| Material | d (nm) |
|---|---|
| SiN | 19.0 |
| SnO2 | 13.5 |
| NiCrOx | 2.0 |
| Ag | 13.3 |
| ZnO | 20.0 |
| ZnSnOx | 15.0 |
| SiN | 15.0 |
| SiN | 1.0 |
| ZnSnOx | 5.3 |
| NiCrOx | 10.0 |
| Ag | 7.0 |
| ZnO | 2.9 |
| ZnSnOx | 6.6 |
| TiO | 7.0 |
| ZnSnOxNy | 10 |
| | 19.3 |

SN 75 A

| | d (nm) |
|---|---|
| SiN | 16.0 |
| SnO2 | 16.6 |
| NiCrOx | 3.0 |
| Ag | 14.3 |
| ZnO | 14.0 |
| ZnSnO2 | 68 |
| NiCrOx | 3.0 |
| Ag | 8.6 |
| ZnO | 8.7 |
| ZnSnO2 | 10 |
| TiOx | 3 |
| SiZrOxNy | 7 |
| Glass | |

Fig. 6

| | Ex. 7(AC) | Ex. 8(HT) | Ex. 9(AC) | Ex. 10(HT) |
|---|---|---|---|---|
| | AC (4m/min) | HT (5m/min) | AC (4m/min) | HT (5m/min) |
| | ID | ID | ID 29260 | ID 23453 |
| | PL Goole | PL Goole | PL Goole | PL Goole |
| TY | 68.1 | 65.5 | 68.5 | 66.6 |
| a* | -5.0 | -4.6 | -4.8 | -4.7 |
| b* | 1.2 | 1.2 | 0.9 | 1.3 |
| RgY | 8.1 | 7.7 | 8.1 | 7.2 |
| a* | -1.2 | -1.4 | -1.4 | -1.5 |
| b* | 8.6 | 8.2 | 8.7 | 7.5 |
| RfY | 9.0 | 9.4 | 8.7 | 9.2 |
| a* | 6.7 | 10.2 | 6.1 | 9.9 |
| b* | 11.6 | 15.3 | 10.9 | 16.5 |
| TY | 62.7 | 60.1 | 62.5 | 60.9 |
| a* | -5.4 | -4.9 | -5.1 | -5.0 |
| b* | 1.4 | 0.9 | 1.1 | 1.3 |
| RgY | 12.3 | 11.3 | 12.0 | 10.9 |
| a* | -2.7 | -2.7 | -2.9 | -2.9 |
| b* | 6.6 | 7.9 | 6.6 | 8.6 |
| RfY | 15.0 | 15.9 | 15.4 | 15.9 |
| a* | 3.4 | 5.5 | 3.8 | 5.3 |
| b* | 5.5 | 6.8 | 5.3 | 8.2 |
| En | 2.39 | 2.29 | 2.30 | 2.30 |
| g-value | 34.9 | 35.3 | 35.00 | 36.1 |
| g-value | 39.4 | 41.0 | 41.0 | 41.0 |
| Tsolar | 35.7 | 35.9 | 37.1 | 37.3 |
| Rsolar out | 31.8 | 29.7 | 31.1 | 29.9 |
| Rsolar in | 43.8 | 43.0 | 42.7 | 43.1 |
| U-value | 1.0 | 1.0 | 1.0 | 1.0 |
| Brush | 2 | 2 | 2 | 2 |

Fig. 7

|  | Ex. 11(AC) | Ex. 12(HT) | Ex. 13(AC) | Ex. 14(HT) |
| --- | --- | --- | --- | --- |
|  | AC (5m/min) | HT (5m/min) | AC (5m/min) | HT (5m/min) |
|  | ID 8206 | ID 12386 | ID 23868 | ID 25314 |
|  | PF Rostov | PF Rostov | PF Rostov | PF Rostov |
| TY | 55.2 | 54.3 | 55.1 | 55.2 |
| a* | -6.1 | -5.3 | -6.0 | -5.8 |
| b* | 0.6 | 0.5 | 0.7 | 0.8 |
| RgY | 7.5 | 8.5 | 8.0 | 7.7 |
| a* | 1.3 | 0.5 | 1.2 | 1.3 |
| b* | -9.0 | -8.1 | -10.2 | -10.8 |
| RfY | 8.0 | 9.3 | 8.1 | 10.5 |
| a* | 8.0 | 10.0 | 8.0 | 9.7 |
| b* | 1.2 | -6.4 | -1.1 | -2.5 |
| 3m extra clear |  |  |  |  |
| TY | 50.4 | 49.7 | 50.3 | 50.3 |
| a* | -6.3 | -6.2 | -6.4 | -6.0 |
| b* | 0.7 | 0.5 | 0.8 | 0.7 |
| RgY | 10.1 | 11.0 | 10.6 | 10.3 |
| a* | 2.8 | 2.0 | 2.7 | 2.7 |
| b* | 7.8 | 7.3 | 8.7 | 9.3 |
| RfY | 15.0 | 16.3 | 15.1 | 17.1 |
| a* | 4.1 | 5.4 | 4.0 | 5.4 |
| b* | 0.0 | -4.4 | 1.3 | 2.1 |
| IGlu – 1.8mm extra clear |  |  |  |  |
| Ɛn | 2.49 | 2.00 | 2.40 | 2.20 |
| g-value | 28.6 | 28.6 | 28.2 | 29.3 |
| g-value | 35.3 | 32.7 | 32.6 | 33.7 |
| Tsolar | 29.5 | 29.6 | 29.1 | 30.3 |
| Rsolar out | 31.7 | 33.1 | 32.7 | 32.2 |
| Rsolar in | 41.8 | 46.7 | 42.8 | 44.0 |
| U-value | 1.0 | 1.0 | 1.0 | 1.0 |
| Brush | 2 | 2 | 3 | 3 |

| SN 52-27 A | |
|---|---|
| Model 4 | d (nm) |
| SiN | 20.0 |
| SnO2 | 16.2 |
| NiCrOx | 2.0 |
| Ag | 14.8 |
| ZnO | 15.0 |
| ZnSnOx | 21.2 |
| SiN | 13.0 |
| C22 | 10 |
| SiN | 13 |
| ZnSnOx | 27.1 |
| NiCrOx | 2.0 |
| Ag | 10.4 |
| ZnO | 8.0 |
| ZnSnOx | 7.0 |
| TiOx | 3.0 |
| ZrSiOxNy | 12.7 |
| GLASS | |

Fig. 10

| SN 52-27 HT | |
|---|---|
| Model HT-Ro | d (nm) |
| SiN | 20.0 |
| SnO2 | 16.0 |
| NiCrOx | 2.0 |
| Ag | 14.2 |
| ZnO | 15.0 |
| ZnSnOx | 16.0 |
| SiN | 13.0 |
| C22 | 11.6 |
| SiN | 13 |
| ZnSnOx | 35.4 |
| NiCrOx | 2.0 |
| Ag | 11.0 |
| ZnO | 8.0 |
| ZnSnOx | 7.0 |
| TiOx | 3.0 |
| ZrSiOxNy | 14.8 |
| GLASS | |

COATED ARTICLE WITH IR REFLECTING LAYER(S) AND SILICON ZIRCONIUM OXYNITRIDE LAYER(S) AND METHOD OF MAKING SAME

This application is a continuation of application Ser. No. 16/036,013, filed Jul. 16, 2018 (now U.S. Pat. No. 10,336,651), the entire disclosure of which is hereby incorporated herein by reference in its entirety.

This invention relates to a coated article having a low-emissivity (low-E) coating including at least first and second infrared (IR) reflecting layers of or including a material such as silver or the like. The low-E coating is designed so that the coated article can realize one or more of: desirable visible transmission, consistent and low emissivity values, thermal stability upon optional heat treatment such as thermal tempering, a low U-value, a desirable LSG value, and desirable coloration and/or reflectivity values. In certain example embodiments, the coating includes a bottom dielectric portion including a layer of or including silicon zirconium oxynitride, and a center dielectric portion including a layer of or including zinc stannate. It has been found that the combination of at least the bottom dielectric portion including a layer of or including silicon zirconium oxynitride, and center dielectric portion including a layer of or including zinc stannate, allows for a combination of desirable visible transmission, consistent and low emissivity values, thermal stability upon optional heat treatment such as thermal tempering, desirable U-value, desirable LSG value, and desirable coloration and/or reflectivity values to be achieved. In certain example embodiments, an absorber layer sandwiched between a pair of dielectric layers may be provided in order to tailor visible transmission such as when lower visible transmission coatings are desired. Coated articles herein may be used in the context of insulating glass (IG) window units, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of desirable visible transmission, desirable color, low emissivity (or emittance), low sheet resistance ($R_s$), desirable LSG values, and/or desirable U-values in the context of IG window units. Desirable visible transmission and desired coloration may permit coated articles to be used in applications where these characteristics are desired such as in IG or vehicle window applications, whereas low emissivity and low sheet resistance permit such coated articles to block significant amounts of IR radiation so as to reduce for example undesirable heating of vehicle or building interiors.

Low-E coatings are typically deposited on a glass substrate by sputtering. Emissivity and/or sheet resistance values of a coating or coated article are driven in large part by the IR reflecting layer(s) which is/are typically made of silver or the like. However, it has been difficult to achieve low tolerance variation with respect to emissivity values of such coatings. In other words, a problem in the art has been difficulty in achieving a desired low emissivity value and/or sheet resistance value within a given small tolerance variation. The tolerance variation has been larger than desired.

In view of the above, it will be appreciated that there exists a need in the art for a coated article including a low-E coating that is designed so that a desired low emissivity value can be achieved within a given small tolerance range (e.g., a tolerance of plus/minus 1%). It would also be desirable to provide such a coating that also achieves one or more of: high visible transmission, low emissivity, thermal stability upon optional heat treatment such as thermal tempering, a low U-value, and desirable coloration and/or reflectivity values.

Conventionally, it has been difficult to achieve desirable LSG values and low $\Delta E^*$ values (e.g., glass side reflective) in coatings having two silver based IR reflecting layers. In example embodiments of this invention, it has surprisingly been found that desirable LSG values and low $\Delta E^*$ values (e.g., glass side reflective) in coatings having two silver based IR reflecting layers are achievable, in combination with other desirable optical characteristics, when the following are combined: (a) the second IR reflecting layer comprising silver is thicker than the first IR reflecting layer comprising silver, more preferably when second IR reflecting layer is at least 10 angstroms (Å) thicker (more preferably at least 20 angstroms thicker, even more preferably at least 30 angstroms thicker, and most preferably at least 40 angstroms thicker) than the first IR reflecting layer comprising silver; (b) provision of the bottom dielectric portion including a layer of or including silicon zirconium oxynitride, (c) center dielectric portion including a layer(s) of or including zinc stannate; (d) a zirconium silicon oxynitride based layer in the bottom dielectric portion of the layer stack is thicker (preferably at least 10 angstroms thicker, more preferably at least 20 angstroms thicker, and most preferably at least 30 angstroms thicker) than is a zinc stannate based layer in the bottom dielectric portion of the layer stack; (e) at least one zinc stannate based layer in the center dielectric portion of the layer stack is thicker (preferably at least 20 angstroms thicker, more preferably at least 40 angstroms thicker, and most preferably at least 60 angstroms thicker) than is a zirconium silicon oxynitride based layer in the bottom dielectric portion of the layer stack; and optionally (f) the absorber 14 in the center stack sandwiched between a pair of silicon nitride inclusive layers 13, 13'.

In certain example embodiments of this invention, it has been found that the combination of at least the bottom dielectric portion including a layer of or including silicon zirconium oxynitride, and center dielectric portion (between IR reflecting layers) including a layer of or including zinc stannate, allows for a combination of desirable visible transmission, consistent and low emissivity values, thermal stability upon optional heat treatment such as thermal tempering, desirable U-value, desirable LSG value, and desirable coloration and/or reflectivity values to be achieved. In certain example embodiments, an absorber layer sandwiched between a pair of dielectric layers may be provided in order to tailor visible transmission such as when lower visible transmission coatings are desired. A layer of or including zirconium silicon oxynitride in the lower dielectric portion of the coating, between the glass substrate and the lowermost IR reflecting layer (e.g., of silver or the like) improves the quality of the IR reflecting layer thereby permitting the coated article to realized low emissivity values with low tolerance variations. Providing zirconium silicon oxynitride under a layer of or including zinc stannate and under a layer of or including zinc oxide, in the lower dielectric portion of the coating, has surprisingly been found to improve the quality of the silver and thus lower emissivity values and lower emissivity tolerance values in a desirable manner. Even though the zirconium silicon oxynitride is not directly contacting the IR reflecting layer, it still improves the quality of the overlying IR reflecting layer thereby permitting thermal properties of the coating to be improved and manufactured in a more consistent manner. The IR reflecting layer has been found to grow better and have a smoother base which can more easily be repeated on a consistent basis. It has also been found that the provision of a layer of or including titanium oxide (e.g., $TiO_2$) over the zirconium silicon oxynitride results in an increase in visible transmission of the coated article and improved optical properties if desired, as well as an increase in line speed.

In an example embodiment of this invention, there is provided a coated article including a coating supported by a glass substrate, the coating comprising moving away from the glass substrate: a dielectric layer comprising zirconium silicon oxynitride; a first layer comprising zinc stannate; a first layer comprising zinc oxide located over and directly contacting the layer comprising zinc stannate; a first infrared (IR) reflecting layer comprising silver located on the substrate over and directly contacting the first layer comprising zinc oxide; and a contact layer comprising metal oxide located over and directly contacting the first IR reflecting layer comprising silver; a second layer comprising zinc stannate on the glass substrate over at least the first IR reflecting layer and the contact layer; a second layer comprising zinc oxide located over at least the second layer comprising zinc stannate; a second IR reflecting layer comprising silver located over at least the first IR reflecting layer, the first and second layers comprising zinc stannate, and the first and second layers comprising zinc oxide; another dielectric layer over at least the second IR reflecting layer comprising silver; wherein the coating contains two silver based IR reflecting layers; wherein the second IR reflecting layer comprising silver is at least 10 angstroms (Å) thicker than the first IR reflecting layer comprising silver; wherein the dielectric layer comprising zirconium silicon oxynitride is at least 10 angstroms (Å) thicker than the first layer comprising zinc stannate; and wherein the second layer comprising zinc stannate is at least 20 angstroms (Å) thicker than the dielectric layer comprising zirconium silicon oxynitride.

BRIEF DESCRIPTION OF THE DRAWINGS

FIG. 3 is a cross sectional view of a coated article according to another example embodiment of this invention, including the stack for Examples 2, 4 and 6.

FIG. 4 is a cross sectional view of a coated article according to another example embodiment of this invention, including the stack for Examples 1, 3 and 5.

FIG. 5 is a schematic diagram illustrating layers stacks according to various example embodiments of this invention, including layer stacks for Examples 7-10.

FIG. 6 is a chart illustrating optical, thermal, and performance data for Examples 1-6.

FIG. 7 is a chart illustrating optical, thermal, and performance data for Examples 7-10.

FIG. 8 is a chart illustrating optical, thermal, and performance data for Examples 11-14.

FIG. 9 is a cross sectional view of a coated article according to another example embodiment of this invention, including the stack for Examples 11 and 13.

FIG. 10 is a cross sectional view of a coated article according to another example embodiment of this invention, including the stack for Examples 12 and 14.

DETAILED DESCRIPTION OF EXAMPLE EMBODIMENTS OF THE INVENTION

Figure 1:
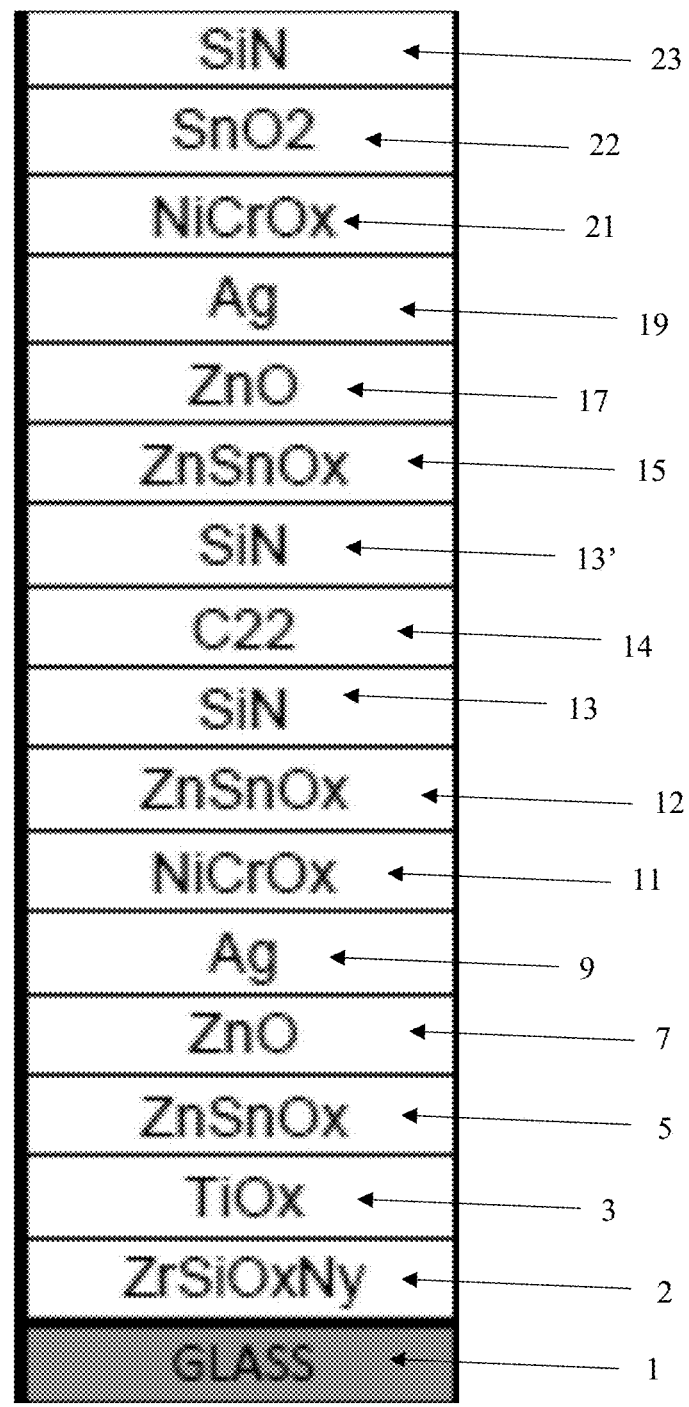
FIG. 1 is a cross sectional view of a coated article according to an example embodiment of this invention.

Referring now to the drawings in which like reference numerals indicate like parts throughout the several views.

Coated articles herein may be used in applications such as monolithic windows, IG window units that include a monolithic coated article, vehicle windows, and/or any other suitable application that includes single or multiple substrates such as glass substrates.

Certain embodiments of this invention relate to a coated article having a low-emissivity (low-E) coating supported by a glass substrate 1, the low-E coating including at least first and second infrared (IR) reflecting layers of or including silver or the like. For example, see IR reflecting layers 9 and 19 in FIG. 1. The low-E coating is designed so that the coated article can realize a combination of: desirable visible transmission, consistent and low emissivity values, thermal stability upon optional heat treatment such as thermal tempering, a low U-value, a desirable LSG value, and desirable coloration and/or reflectivity values. In certain example embodiments, the coating includes a bottom dielectric portion including a layer of or including silicon zirconium oxynitride 2, and a center dielectric portion including a layer of or including zinc stannate 12 and/or 15. It has been found that the combination of at least the bottom dielectric portion including a layer of or including silicon zirconium oxynitride 2, and center dielectric portion including a layer of or including zinc stannate 12 and/or 15, allows for a combination of desirable visible transmission, consistent and low emissivity values, thermal stability upon optional heat treatment such as thermal tempering, desirable U-value, desirable LSG value, and desirable coloration and/or reflectivity values to be achieved. In certain example embodiments, an absorber layer 14 sandwiched between a pair of dielectric layers 13, 13' (e.g. of or including silicon nitride which may be doped with aluminum or the like) may be provided in order to tailor visible transmission such as when lower visible transmission coatings are desired. Coated articles herein may be used in the context of insulating glass (IG) window units, or in other suitable applications such as monolithic window applications, laminated windows, and/or the like.

The provision of a layer of or including zirconium silicon oxynitride 2 in the lower dielectric portion of the coating, between the glass substrate 1 and the IR reflecting layer (e.g., of silver or the like) 9 improves the quality of the IR reflecting layer 9 thereby permitting the coated article to realized low emissivity values with low tolerance variations. And providing zirconium silicon oxynitride 2 under a layer of or including zinc stannate 5 and/or under a layer of or including zinc oxide 7, in the lower dielectric portion of the coating, has been found to improve the quality of the silver and thus improve (lower) emissivity and lower emissivity tolerance values. Even though the zirconium silicon oxynitride 2 is not directly contacting the IR reflecting layer 9, it still surprisingly improves the quality of the overlying IR reflecting layers thereby permitting thermal properties of the coating to be improved and manufactured in a more consistent manner. The IR reflecting layers 9 and 19 have been found to grow better and have a smoother base which can more easily be repeated on a consistent basis. It has also been surprisingly found that the provision of a layer of or including titanium oxide (e.g., $TiO_2$) 3 over the zirconium silicon oxynitride 2 results in an increase in visible transmission of the coated article and improved optical properties, as well as an increase in line speed.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick, with an example glass substrate being a clear glass substrate about 3.8 to 4.0 mm thick), and a multi-layer low-E coating (or layer system) provided on the substrate 1 either directly or indirectly. As shown in FIG. 1, the low-E coating includes: dielectric layer of or including zirconium silicon oxynitride 2, dielectric layer of or including titanium oxide (e.g., $TiO_2$) 3, dielectric layers 5, 12, 15 of or including zinc stannate, dielectric layers 7 and 17 of or including zinc oxide which may optionally be doped with a metal such as Sn or Al, IR reflecting layers 9 and 19 of or including silver, gold, or the like, upper contact layers 11 and 21 of or including Ni, Cr, NiCr, NiCrMo, or any oxide thereof such as an oxide of NiCr or an oxide of NiCrMo, dielectric layer 22 of or including a metal oxide such as tin oxide (e.g., $SnO_2$), zinc stannate, or the like, and dielectric layer 23 of or including a material such as silicon nitride (e.g., $Si_3N_4$) and/or silicon oxynitride, and an optional dielectric overcoat layer (not shown) of a material such as zirconium oxide (e.g., $ZrO_2$). In order to tailor the visible transmission of the coating to a desired value the coating may also include an absorber layer 14 provided between a pair of dielectric layers 13, 13' of or including silicon nitride or the like. The absorber layer 14 is preferably metallic or substantially metallic (contains from 0-10% oxygen, more preferably from 0-5% oxygen, atomic %), and may be of or include NiCr, NiCrMo, NbZr, or the like. It is noted that "C22" is a NiCrMo based material, which may be used for the absorber layer 14 in certain example embodiments. Other layers and/or materials may additionally be provided in certain example embodiments of this invention, and it is also possible that certain layers may be removed or split in certain example instances. For example, optionally a layer of or including silicon nitride and/or silicon oxynitride (not shown) may be provided between the glass substrate 1 and the zirconium silicon oxynitride 2. Moreover, other materials may be used for particular layers instead of the materials mentioned above in certain example embodiments of this invention.

Figure 2:
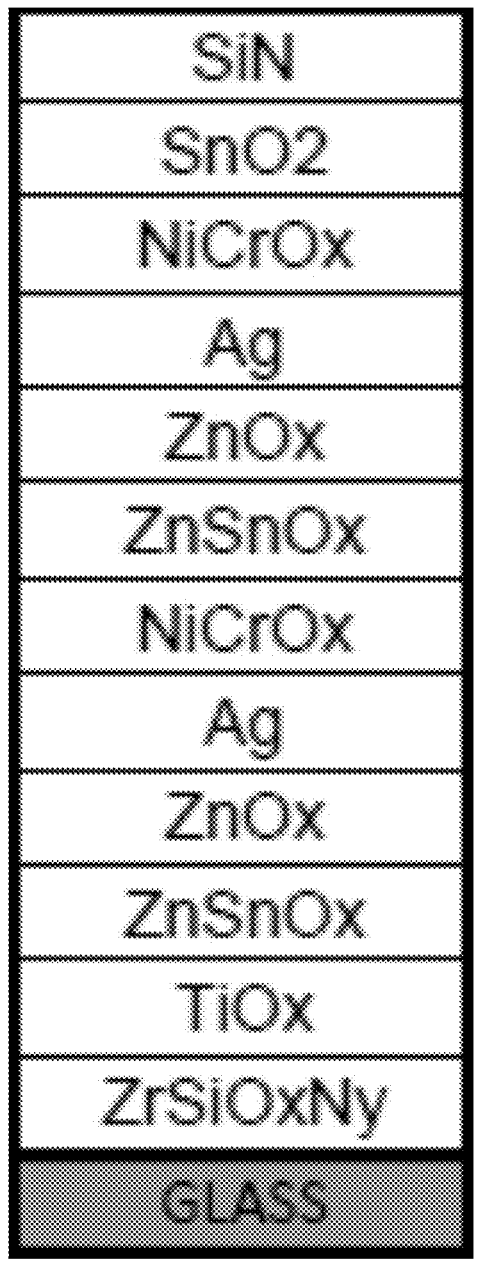
FIG. 2 is a cross sectional view of a coated article according to another example embodiment of this invention.

FIG. 2 is a cross sectional view of a coated article according to another example embodiment of this invention. FIG. 2 illustrates that layers 13, 13' and 14 from the FIG. 1 embodiment may be omitted, in certain example embodiments of this invention.

FIGS. 3-5 are cross sectional views of coated articles including coatings according to example embodiments of this invention, with example thicknesses (d) of layers in units of nm being listed for purposes of example.

In monolithic instances, the coated article includes only one substrate such as glass substrate 1. However, monolithic coated articles herein may be used in devices such as IG window units for example. Typically, an IG window unit may include two spaced apart glass substrates, with a gap defined therebetween. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. An example IG window unit may include, for example, the coated glass substrate of any of FIGS. 1-5 coupled to another glass substrate via spacer(s), sealant(s) or the like with a gap being defined therebetween. This gap between the substrates in IG unit embodiments may in certain instances be filled with a gas such as argon (Ar), or a mixture of air and argon gas. An example IG unit may comprise a pair of spaced apart substantially clear glass substrates each about 4 mm (e.g., 3.8 mm) thick one of which is coated with a coating herein in certain example instances, where the gap between the substrates may be from about 5 to 30 mm, more preferably from about 10 to 20 mm, and most preferably about 16 mm. In certain example instances, the coating may be provided on the side of the outer/exterior glass substrate 1 facing the gap (although the coating may be on the other substrate in certain alternative embodiments), which is often referred to as surface two of the IG window unit.

In certain example IG unit embodiments of this invention, the coating is designed such that the resulting IG unit (e.g., with, for reference purposes, a pair of 3.8 mm clear glass substrates spaced apart by 16 mm with a mixture of air and Ar gas in the gap) has a U-value of no greater than 1.4 $W/(m^2K)$, more preferably no greater than 1.3 $W/(m^2K)$, sometimes no greater than 1.1 $W/(m^2K)$, and sometimes no greater than 1.0 $W/(m^2K)$. U-value herein is measured and referred to in accordance with EN 410-673_2011—Winter, the disclosure of which is hereby incorporated herein by reference. Indeed, it is preferred that the optical and thermal features discussed herein are achieved when the coating contains two silver-based IR reflecting layers (e.g., as shown in FIGS. 1-5), as opposed to a single or triple-silver layer stack.

The nitrogen/oxygen ratio in the zirconium silicon oxynitride layer 2 has been found to be significant in certain example embodiments. Too much oxygen in zirconium silicon oxynitride layer 2 may result in a reduced sputter rate and does not seem to help reduce absorption or increase transmission. Too much oxygen in this layer 2 may result in undesirable haze. Accordingly, in certain example embodiments of this invention, the layer 2 of or including zirconium silicon oxynitride has a nitrogen to oxygen ratio (nitrogen/oxygen ratio) of at least 1 more preferably of at least 3, more preferably at least 4, and even more preferably at least 5 (using atomic %). Thus, for example, layer 2 may contain at least three times more N than O, more preferably at least four times as much N than O, and most preferably at least five times as much N than O. For example in certain example embodiments of this invention, layer 2 is sputter-deposited using a ZrSi target, using from about 0.4 to 2.0, more preferably from about 0.5 to 1.5, and most preferably about 0.8 to 1.0 ml/kW $O_2$ gas, and from about 4.0 to 10.0, more preferably from about 5.0 to 8.0, and most preferably from about 6.0 to 7.0 ml/kW $N_2$ gas. Argon (Ar) gas may also be used in the sputtering process.

Moreover, it has also been found that, in zirconium silicon oxynitride layer 2, too much Zr may result in an undesirably brittle material and too little Zr may cause the silver layer 9 to be not as smooth and degrades coating qualities. It has been found that better results in these respects are achieved when the layer 2 contains more Si than Zr (atomic %). For example, the Zr/Si (atomic) ratio in layer 2 (and in the sputtering target for depositing layer 2) is preferably from 0.20 to 0.60, more preferably from 0.30 to 0.47, and most preferably from 0.35 to 0.44. For example, a sputtering target(s) containing about 40% Zr and about 60% Si may be used to sputter-deposit layer 2.

Dielectric layer 3 may be of or include titanium oxide in certain example embodiments of this invention. The titanium oxide of layer 3 may in certain example instances be represented by $TiO_x$, where x is from 1.5 to 2.5, most preferably about 2.0. The titanium oxide may be deposited via sputtering or the like in different embodiments. In certain example instances, dielectric layer 3 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 is controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

In example embodiments, the dielectric zinc stannate (e.g., $ZnSnO$, $Zn_2SnO_4$, or the like) based layers 5, 12 and/or 15 may optionally include more Zn than Sn by weight. For example, the metal content of one or more of these zinc stannate based layers may include from about 51-90% Zn and from about 10-49% Sn, more preferably from about 51-70% Zn and from about 30-49% Sn, with an example being about 52% Zn and about 48% Sn (weight %, in addition to the oxygen in the layer) in certain example embodiments of this invention. Thus, for example, the zinc stannate based layers may be sputter-deposited using a metal target comprising about 52% Zn and about 48% Sn in certain example embodiments of this invention. Optionally, the zinc stannate based layers may be doped with other metals such as Al or the like. In certain optional embodiments, it is possible to dope the zinc stannate (e.g., ZnSnO) with other materials such as Al, Zn, N, or the like. The zinc stannate based layers are substantially or substantially fully oxidized in preferred embodiments of this invention.

Layers 7 and 17 in certain embodiments of this invention are of or include zinc oxide (e.g., ZnO). The zinc oxide of these layers may contain other materials as well such as Al (e.g., to form $ZnAlO_x$) or Sn. For example, in certain example embodiments of this invention, one or more of zinc oxide layers 7, 17 may be doped with from about 1 to 10% Al, more preferably from about 1 to 5% Al, and most preferably about 1 to 4% Al. The zinc oxide layer(s) 7 and/or 17, in combination with the zinc stannate and zirconium silicon oxynitride 2, helps improve silver quality and emissivity characteristics of the coating.

Dielectric layers 13, 13', 23 may be of or include silicon nitride in certain embodiments of this invention. Silicon nitride may, among other things, improve heat-treatability of the coated articles, e.g., such as thermal tempering or the like, and may or may not include some oxygen. The silicon nitride of these layers may be of the stoichiometric type (i.e., $Si_3N_4$), or alternatively of the Si-rich type in different embodiments of this invention.

Infrared (IR) reflecting layers 9, 19 are preferably substantially or entirely metallic and/or conductive, and may comprise or consist essentially of silver (Ag), gold, or any other suitable IR reflecting material. IR reflecting layers help allow the coating to have low-E and/or good solar control characteristics. The IR reflecting layers may, however, be slightly oxidized in certain embodiments of this invention and may optionally be doped with other material such as Pd or the like. The coating preferably contains two IR reflecting layers 9, 19 in preferred embodiments of this invention.

Conventionally, it has been difficult to achieve desirable LSG values and low ΔE* values (e.g., glass side reflective) in coatings having two silver based IR reflecting layers. In example embodiments of this invention, it has surprisingly been found that desirable LSG values and low ΔE* values (e.g., glass side reflective) in coatings having two silver based IR reflecting layers are achievable, in combination with other desirable optical characteristics, when the following are combined: (a) the second IR reflecting layer comprising silver 19 is thicker than the first IR reflecting layer comprising silver 9, more preferably when second IR reflecting layer 19 is at least 10 angstroms (Å) thicker (more preferably at least 20 angstroms thicker, even more preferably at least 30 angstroms thicker, and most preferably at least 40 angstroms thicker) than the first IR reflecting layer comprising silver 9; (b) provision of the bottom dielectric portion including a layer of or including silicon zirconium oxynitride 2, (c) center dielectric portion including a layer(s) of or including zinc stannate 12 and/or 15; (d) zirconium silicon oxynitride based layer 2 in the bottom dielectric portion of the layer stack is thicker (preferably at least 10 angstroms thicker, more preferably at least 20 angstroms thicker, and most preferably at least 30 angstroms thicker) than is the zinc stannate based layer 5 in the bottom dielectric portion of the layer stack; (e) at least one zinc stannate based layer (e.g., 12) in the center dielectric portion of the layer stack is thicker (preferably at least 20 angstroms thicker, more preferably at least 40 angstroms thicker, and most preferably at least 60 angstroms thicker) than is the zirconium silicon oxynitride based layer 2 in the bottom dielectric portion of the layer stack; and optionally (f) the absorber 14 in the center stack sandwiched between a pair of silicon nitride inclusive layers 13, 13'.

The upper contact layers 11, 21 may be of or include nickel (Ni) oxide, chromium/chrome (Cr) oxide, or a nickel alloy oxide such as nickel chrome oxide ($NiCrO_x$), $NiCrMoO_x$, or other suitable material(s) such as Ni, Ti or an oxide of Ti, or $NiTiO_x$, in certain example embodiments of this invention. The use of, for example, $NiCrO_x$ in these layers allows durability to be improved. These layers may be fully oxidized in certain embodiments of this invention (i.e., fully stoichiometric), or alternatively may only be partially oxidized (i.e., sub-oxide). In certain instances, the $NiCrO_x$ layer 11 may be at least about 50% oxidized. Descriptions of various types of oxidation graded contact layers that may optionally be used are set forth in U.S. Pat. No. 6,576,349, the disclosure of which is hereby incorporated herein by reference. Contact layer 11 may or may not be continuous in different embodiments of this invention across the entire underlying IR reflecting layer 9.

Transparent dielectric layer 22 may be of or include tin oxide in certain example embodiments of this invention. However, it may be doped with certain other materials in other example embodiments, such as with Al or Zn in certain example alternative embodiments.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 or FIG. 2 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate 1 outwardly (e.g., the Al content in the zinc oxide layers may be from about 1-10%, more preferably from about 1-3% in certain example instances):

TABLE 1

(Example Materials/Thicknesses; FIG. 1 Embodiment)

| Layer | Preferred Range (Å) | More Preferred (Å) | Example (Å) |
|---|---|---|---|
| ZrSiO$_x$N$_y$ (layer 2) | 20-300 Å | 50-200 Å | 90-160 Å |
| TiO$_x$ (layer 3) | 15-150 Å | 20-60 Å | 30 Å |
| ZnSnO (layer 5) | 20-150 Å | 30-80 Å | 45-65 Å |
| ZnAlO$_x$ (layer 7) | 40-170 Å | 50-100 Å | 65-90 Å |
| Ag (layer 9) | 50-130 Å | 80-120 Å | 90-110 Å |
| NiCrO$_x$ (layer 11) | 10-70 Å | 15-35 Å | 20-30 Å |
| ZnSnO (layer 12) | 170-500 Å | 210-400 Å | 230-270 Å |
| Si$_3$N$_4$ (layer 13) | 50-350 Å | 100-200 Å | 120-160 Å |
| absorber (layer 14) | 40-210 Å | 60-150 Å | 80-140 Å |
| Si$_3$N$_4$ (layer 13') | 50-350 Å | 100-200 Å | 120-160 Å |
| ZnSnO (layer 15) | 20-300 Å | 100-200 Å | 130-170 Å |
| ZnAlO$_x$ (layer 17) | 40-500 Å | 50-400 Å | 65-200 Å |
| Ag (layer 19) | 90-200 Å | 130-180 Å | 130-150 Å |
| NiCrO$_x$ (layer 21) | 10-70 Å | 15-35 Å | 20-30 Å |
| SnO$_2$ (layer 22) | 50-400 Å | 100-300 Å | 130-180 Å |
| Si$_3$N$_4$ (layer 23) | 50-400 Å | 150-280 Å | 190-240 Å |

In certain example embodiments of this invention, coated articles according to the FIG. 1 and/or FIG. 2 embodiments herein may have the following characteristics set forth in Table 2 when measured monolithically or in an IG window unit, and these values refer to both heat treated and non-heat treated embodiments. Note that E$_n$ is normal emissivity/emittance.

TABLE 2

Low-E/Solar Characteristics (HT or non-HT)

| Characteristic | General | More Preferred | Most Preferred |
|---|---|---|---|
| R$_s$ (ohms/sq.): | <= 8.0 | <= 7.0 | <= 5.0 |
| E$_n$: | <= 4% | <= 3% | <= 2.5% |

Moreover, coated articles including coatings according to the FIG. 1 and FIG. 2 embodiments of this invention may have the following optical/color/thermal stability characteristics (e.g., when the coating(s) is provided on a clear soda lime silica glass substrate 1 from 1 to 10 mm thick, preferably about 4 mm thick such as 3.8 mm thick), as shown in Table 3 below. In Table 4, all parameters are measured monolithically. Note that "f" stands for film side, and "g" stands for glass side. Thus, R$_f$Y is film side reflectance, which is visible reflectance measured form the film side of the coated substrate. And R$_g$Y is glass side reflectance, which is visible reflectance measured form the glass side of the coated substrate. Glass side reflectance, and glass side reflective color values a*$_g$ and b*$_g$ are typically deemed to be the most important when the coating is provided on surface two of an IG window unit because this indicates how the outside of the building will appear. Note that ΔE* is a value indicative of thermal stability, and in particular how much the optical characteristics changes upon heat treatment (HT) such as thermal tempering. The lower a ΔE* value, the less the applicable a*, b* and L* values change upon HT (e.g., thermal tempering). The low ΔE* values of the coatings discussed herein demonstrate that HT and non-HT versions of each coating substantially matching with respect to coloration. Note that the equation for determining ΔE* is known in the art and is described for example in U.S. Pat. No. 8,263,227, the disclosure of which is hereby incorporated herein by reference.

TABLE 3

Example Optical Characteristics (Monolithic, HT or non-HT)

| Characteristic | General | More Preferred |
|---|---|---|
| T$_{vis}$ (or TY)(Ill. C, 2 deg.): | 40-80% | 45-78% |
| a*$_t$ (Ill. C, 2°): | −7.0 to −2.0 | −6.0 to −3.0 |
| b*$_t$ (Ill. C, 2°): | −2.0 to +8.0 | 0.0 to +5.0 |
| R$_f$Y (Ill. C, 2 deg.): | <= 13% | <= 11% or <= 10% |
| a*$_f$ (Ill. C, 2°): | −11.0 to +8.0 | −8.0 to +3.0 |
| b*$_f$ (Ill. C, 2°): | −14.0 to +10.0 | −11.0 to +1.0 |
| ΔE*$_f$: | <= 4.0 or <= 2.0 | <= 1.5 |
| R$_g$Y (Ill. C, 2 deg.): | <= 13% | <= 11% |
| a*$_g$ (Ill. C, 2°): | −5.0 to +4.0 | −3.0 to +1.0 |
| b*$_g$ (Ill. C, 2°): | −20.0 to +10.0 | −18.0 to −5.0 |
| ΔE*$_g$: | <= 2.5 or <= 2.0 | <= 1.5 |

Examples 1-14

Examples 1-14 are provided for purposes of example only, and are not intended to be limiting. FIG. 3 shows the layer stacks for Examples 2, 4 and 6, and FIG. 4 shows the layer stacks for Examples 1, 3 and 5. The second layer stack in FIG. 5 is the layer stack for Examples 7 and 9, and the third layer stack in FIG. 5 is the layer stack for Examples 8 and 10. FIG. 9 shows the layer stack for Examples 11 and 13, and FIG. 10 shows the layer stack for Examples 12 and 14.

Figure 6:
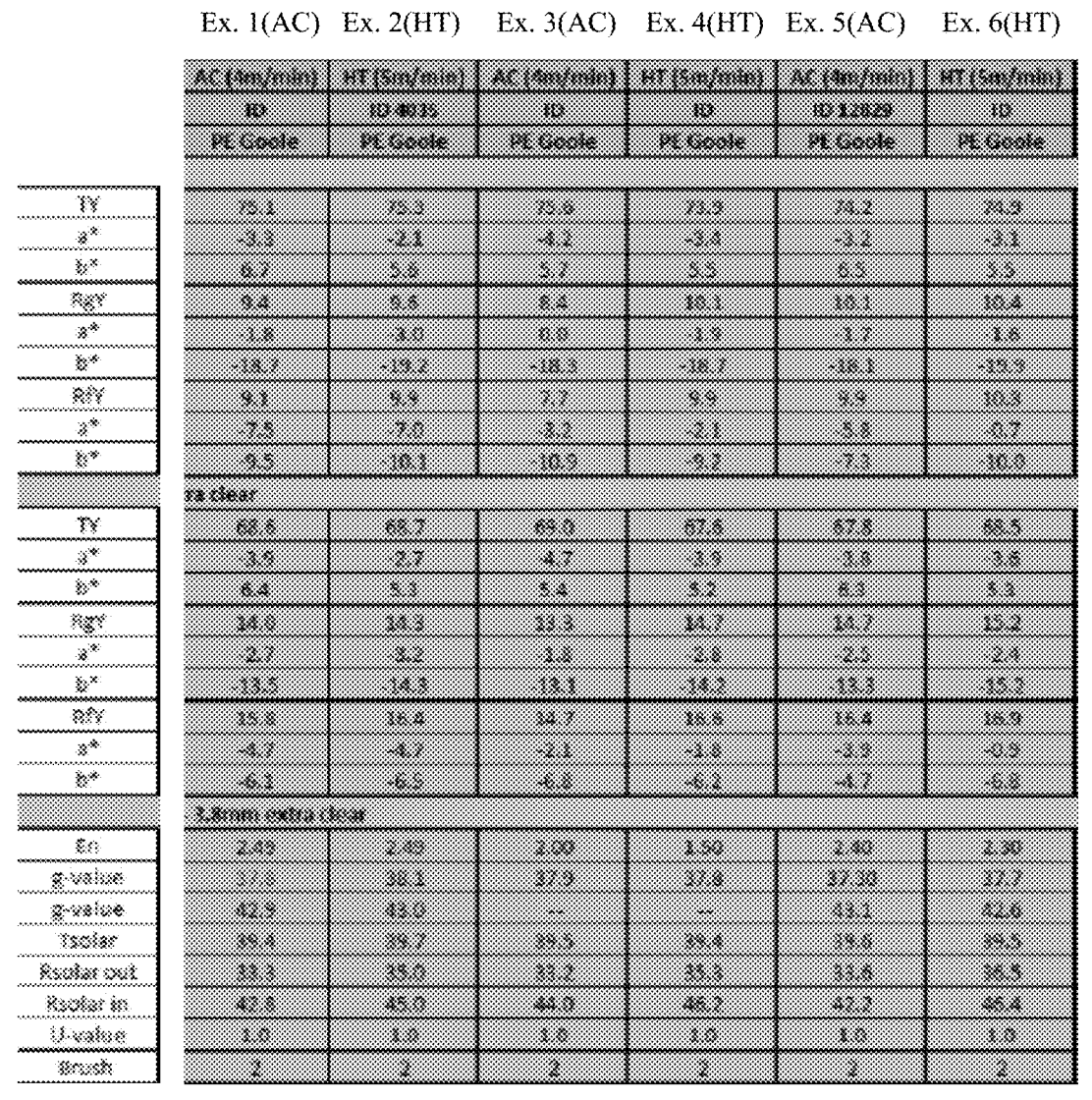

Data from Examples 1-14 is shown in FIGS. 6-8. In FIGS. 6-8, monolithic data (AC or as coated) is shown, as is heat treated (HT) data such as for thermal tempering. The data in the upper third of FIGS. 6-8 is monolithic measured data, whereas the data in the center sections of FIGS. 6-8 is IG data where the coating is provided on surface two of an IG window unit with 3.8-4.0 mm thick glass substrates. The silicon nitride layers were deposited by sputtering a silicon target (doped with about 8% Al) in an atmosphere including argon and nitrogen gas. FIGS. 6-8 demonstrate that the Examples were able to achieve, in the context of a double silver coating, a combination of: desirable visible transmission, consistent and low emissivity values, thermal stability upon optional heat treatment such as thermal tempering, a low U-value, a desirable LSG value, and desirable coloration and/or reflectivity values.

In an example embodiment of this invention, there is provided a coated article including a coating supported by a glass substrate, the coating comprising moving away from the glass substrate: a dielectric layer comprising zirconium silicon oxynitride; a first layer comprising zinc stannate; a first layer comprising zinc oxide located over and directly contacting the layer comprising zinc stannate; a first infrared (IR) reflecting layer comprising silver located on the substrate over and directly contacting the first layer comprising zinc oxide; and a contact layer comprising metal oxide located over and directly contacting the first IR reflecting layer comprising silver; a second layer comprising zinc stannate on the glass substrate over at least the first IR reflecting layer and the contact layer; a second layer comprising zinc oxide located over at least the second layer comprising zinc stannate; a second IR reflecting layer comprising silver located over at least the first IR reflecting layer, the first and second layers comprising zinc stannate, and the first and second layers comprising zinc oxide; another dielectric layer over at least the second IR reflecting layer comprising silver; wherein the coating contains two silver based IR reflecting layers; wherein the second IR reflecting layer comprising silver is at least 10 angstroms (Å) thicker than the first IR reflecting layer comprising silver; wherein the dielectric layer comprising zirconium silicon oxynitride is at least 10 angstroms (Å) thicker than the first layer comprising zinc stannate; and wherein the second layer comprising zinc stannate is at least 20 angstroms (Å) thicker than the dielectric layer comprising zirconium silicon oxynitride.

The coated article of the immediately preceding paragraph may further comprise an absorber layer sandwiched between and contacting first and second dielectric layers comprising silicon nitride, between the first and second IR reflecting layers. The absorber layer may be of or include Ni and Cr, and/or Ni, Cr and Mo. The absorber layer may be metallic or substantially metallic.

In the coated article of any of the preceding two paragraphs, the second IR reflecting layer comprising silver may be at least 20 angstroms (Å) thicker than the first IR reflecting layer comprising silver, more preferably at least 40 angstroms (Å) thicker than the first IR reflecting layer comprising silver.

In the coated article of any of the preceding three paragraphs, the dielectric layer comprising zirconium silicon oxynitride may be at least 20 angstroms (Å) thicker than the first layer comprising zinc stannate.

In the coated article of any of the preceding four paragraphs, the second layer comprising zinc stannate may be at least 40 angstroms (Å) thicker than the dielectric layer comprising zirconium silicon oxynitride, more preferably at least 60 angstroms (Å) thicker than the dielectric layer comprising zirconium silicon oxynitride.

In the coated article of any of the preceding five paragraphs, the layer comprising zirconium silicon oxynitride may contain at least three times as much nitrogen as oxygen.

In the coated article of any of the preceding six paragraphs, a ratio of Zr/Si (atomic) may be from 0.30 to 0.47 in the layer comprising zirconium silicon oxynitride, more preferably from 0.35 to 0.44.

In the coated article of any of the preceding seven paragraphs, there may be a layer comprising titanium oxide over and directly contacting the layer comprising zirconium silicon oxynitride.

In the coated article of any of the preceding eight paragraphs, the layer comprising zirconium silicon oxynitride may directly contact the glass substrate.

In the coated article of any of the preceding nine paragraphs, the layer comprising zirconium silicon oxynitride may be from about 50-200 Å thick.

In the coated article of any of the preceding ten paragraphs, measured monolithically the coated article may have a visible transmission of at least 40%.

In the coated article of any of the preceding eleven paragraphs, the contact layer may comprise Ni and/or Cr.

In the coated article of any of the preceding twelve paragraphs, the coated article may be configured to have a glass side reflective $\Delta E^*$ value of no greater than 2.5 due to heat treatment sufficient for thermal tempering, more preferably no greater than 1.5 due to heat treatment sufficient for thermal tempering.

The coated article of any of the preceding thirteen paragraphs may further comprise: an absorber layer sandwiched between and contacting first and second dielectric layers comprising silicon nitride, between the first and second IR reflecting layers; a third layer comprising zinc stannate located over the absorber layer and over the first and second dielectric layers comprising silicon nitride; wherein the third layer comprising zinc stannate is located under and directly contacting the second layer comprising zinc oxide.

The coated article of any of the preceding fourteen paragraphs may be provided in an IG window unit, wherein the IG window unit has a U-value of no greater than 1.1, the IG window unit further comprising another glass substrate, and wherein the coating may be on surface two of the IG window unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising moving away from the glass substrate:
   a dielectric layer comprising zirconium and oxygen;
   a first layer comprising zinc stannate;
   a first layer comprising zinc oxide located over and directly contacting the layer comprising zinc stannate;
   a first infrared (IR) reflecting layer comprising silver located on the substrate over and directly contacting the first layer comprising zinc oxide; and
   a contact layer comprising metal oxide located over and directly contacting the first IR reflecting layer comprising silver;
   a second layer comprising zinc stannate on the glass substrate over at least the first IR reflecting layer and the contact layer;
   a second layer comprising zinc oxide located over at least the second layer comprising zinc stannate;
   a second IR reflecting layer comprising silver located over at least the first IR reflecting layer, the first and second layers comprising zinc stannate, and the first and second layers comprising zinc oxide;
   another dielectric layer over at least the second IR reflecting layer comprising silver;
   wherein the coating contains two silver based IR reflecting layers;
   wherein the second IR reflecting layer comprising silver is at least 10 angstroms (Å) thicker than the first IR reflecting layer comprising silver;

wherein the dielectric layer comprising zirconium and oxygen is at least 10 angstroms (Å) thicker than the first layer comprising zinc stannate; and wherein the second layer comprising zinc stannate is at least 20 angstroms (Å) thicker than the dielectric layer comprising zirconium and oxygen.

2. The coated article of claim 1, wherein the coating further comprises an absorber layer sandwiched between and contacting first and second dielectric layers comprising silicon nitride, between the first and second IR reflecting layers.

3. The coated article of claim 2, wherein the absorber layer comprises Ni and Cr.

4. The coated article of claim 1, wherein the second IR reflecting layer comprising silver is at least 20 angstroms (Å) thicker than the first IR reflecting layer comprising silver.

5. The coated article of claim 1, wherein the layer comprising zirconium and oxygen directly contacts the glass substrate.

6. The coated article of claim 1, wherein measured monolithically the coated article has a visible transmission of at least 40%.

7. The coated article of claim 1, wherein the coated article is configured to have a glass side reflective ΔE* value of no greater than 2.5 due to heat treatment sufficient for thermal tempering.

8. The coated article of claim 1, wherein the coated article is configured to have a glass side reflective ΔE* value of no greater than 1.5 due to heat treatment sufficient for thermal tempering.

9. A coated article including a coating supported by a glass substrate, the coating comprising moving away from the glass substrate:

a dielectric layer comprising zirconium and oxygen;

a first layer comprising zinc stannate;

a first layer comprising zinc oxide located over and directly contacting the layer comprising zinc stannate;

a first infrared (IR) reflecting layer comprising silver located on the substrate over and directly contacting the first layer comprising zinc oxide; and a contact layer comprising metal oxide located over and directly contacting the first IR reflecting layer comprising silver;

a second layer comprising zinc stannate on the glass substrate over at least the first IR reflecting layer and the contact layer;

a second layer comprising zinc oxide located over at least the second layer comprising zinc stannate;

a second IR reflecting layer comprising silver located over at least the first IR reflecting layer, the first and second layers comprising zinc stannate, and the first and second layers comprising zinc oxide;

another dielectric layer over at least the second IR reflecting layer comprising silver;

wherein the coating contains two silver based IR reflecting layers; and wherein the coating is characterized by at least one of: (a) the second IR reflecting layer comprising silver is at least 10 angstroms (Å) thicker than the first IR reflecting layer comprising silver; (b) the dielectric layer comprising zirconium and oxygen is at least 10 angstroms (Å) thicker than the first layer comprising zinc stannate; and (c) the second layer comprising zinc stannate is at least 20 angstroms (Å) thicker than the dielectric layer comprising zirconium and oxygen.

10. The coated article of claim 9, wherein the coating is characterized by at least two of (a), (b) and (c).

* * * * *